(12) United States Patent
Hillier et al.

(10) Patent No.: US 12,244,733 B2
(45) Date of Patent: Mar. 4, 2025

(54) AUTHORIZING SECURE CONNECTIONS RESPONSIVE TO CERTIFICATES BOUND TO LOGICAL IDENTIFIERS

(71) Applicant: HEWLETT PACKARD ENTERPRISE DEVELOPMENT LP, Houston, TX (US)

(72) Inventors: Christopher Anthony Grant Hillier, Fort Collins, CO (US); Gareth David Richards, Woodstock (GB); Ludovic Emmanuel Paul Noel Jacquin, Bristol (GB); Thomas M. Laffey, Roseville, CA (US)

(73) Assignee: Hewlett Packard Enterprise Development LP, Spring, TX (US)

( * ) Notice: Subject to any disclaimer, the term of this patent is extended or adjusted under 35 U.S.C. 154(b) by 456 days.

(21) Appl. No.: 17/808,777

(22) Filed: Jun. 24, 2022

(65) Prior Publication Data
US 2023/0421389 A1 Dec. 28, 2023

(51) Int. Cl.
| | |
|---|---|
| *H04L 9/32* | (2006.01) |
| *G06F 21/60* | (2013.01) |
| *G06F 21/64* | (2013.01) |
| *H04L 41/0893* | (2022.01) |

(52) U.S. Cl.
CPC .......... *H04L 9/3263* (2013.01); *G06F 21/602* (2013.01); *G06F 21/64* (2013.01); *H04L 41/0893* (2013.01)

(58) Field of Classification Search
CPC ..... H04L 63/1491; H04L 9/32; H04L 9/3263; H04L 41/0893; G06F 21/60; G06F 21/64; G06F 21/602
See application file for complete search history.

(56) References Cited

U.S. PATENT DOCUMENTS

| | | |
|---|---|---|
| 9,621,355 B1 | 4/2017 | Ochmanski et al. |
| 10,791,462 B2 | 9/2020 | Lear et al. |
| 11,025,608 B2 | 6/2021 | Friel et al. |
| 11,025,628 B2 | 6/2021 | Lear et al. |
| 12,015,722 B2 * | 6/2024 | Jain ........................ H04L 9/3268 |
| 2011/0225426 A1 * | 9/2011 | Agarwal ................. G06F 21/41 713/175 |
| 2017/0295168 A1 * | 10/2017 | Wan .................... H04L 63/0876 |
| 2020/0193065 A1 | 6/2020 | Smith |
| 2020/0204380 A1 | 6/2020 | Laffey |

(Continued)

FOREIGN PATENT DOCUMENTS

EP    3468133 A1 *  4/2019  ............. H04L 29/06

*Primary Examiner* — Jayesh M Jhaveri
(74) *Attorney, Agent, or Firm* — Trop, Pruner & Hu, P.C.

(57) ABSTRACT

A process includes communicating by a first device, with a second device. The communicating includes the first device receiving data from the second device that represents a certificate. The certificate binds a hierarchy of logical identifiers to a cryptographic key. The hierarchy of identifiers includes a first logical identifier that corresponds to a group membership. The process includes authenticating, by the first device, the second device based on the certificate. The process includes allowing, by the first device, a secure connection to be set up between the first device and the second device based on whether the first logical identifier represents that the second device is a member of a first group of devices of which the first device is a member.

18 Claims, 9 Drawing Sheets

(56) References Cited

U.S. PATENT DOCUMENTS

| | | |
|---|---|---|
| 2020/0327231 A1 | 10/2020 | Smith |
| 2020/0382519 A1* | 12/2020 | Barton .................. H04L 63/107 |
| 2021/0135872 A1 | 5/2021 | Laffey et al. |
| 2021/0258665 A1 | 8/2021 | Sadasivarao et al. |

* cited by examiner

US 12,244,733 B2

AUTHORIZING SECURE CONNECTIONS RESPONSIVE TO CERTIFICATES BOUND TO LOGICAL IDENTIFIERS

BACKGROUND

A cluster is a group of interconnected computers, or nodes, which combine their individual processing and/or storage capabilities to function as a single, high-performance machine. A cluster may be used for a number of different purposes, such as load balancing, high availability (HA) server applications, storage, and parallel processing. Nodes of a given cluster may be connected by public network fabric and communicate with each other via secure connections.

DETAILED DESCRIPTION

Figure 1:
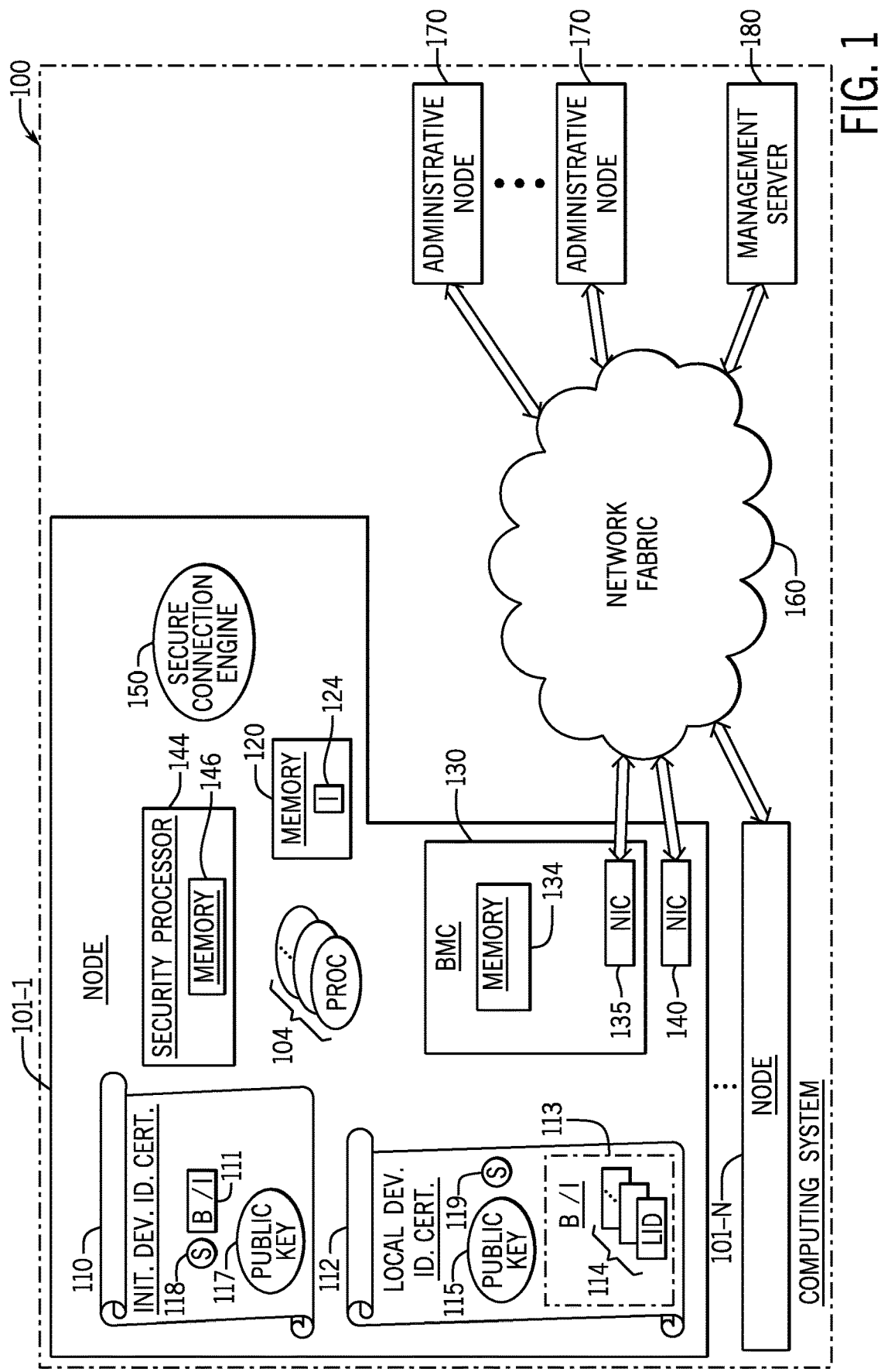
FIG. 1 is a block diagram of a computing system according to an example implementation.

Nodes of a cluster may communicate with each other over a public network and use mutually-authenticated, secure connections for these communications. In this context, a "secure connection" generally refers to a communication channel between two network endpoints (e.g., nodes), which is associated with measures to protect the content that is communicated over the communication channel. Here, "protecting the content" may include one or multiple of the following: anonymizing the content; encrypting the content; cryptographically wrapping network packets; preventing a third party from accessing the content; preventing a third party from modifying, creating or adding to the content; or any other protective measure. In the context used herein, "authentication" refers to a process to verify the identity of an entity for purposes of determining whether the entity is who the entity claims to be. Authenticating an entity results in the authentication passing (i.e., the identity being verified) or failing (i.e., the identity not being verified).

"Mutual authentication," in the context of network endpoints (e.g., nodes), refers to each network endpoint of a pair of network endpoints verifying the identity of the other network endpoint. One way to perform mutual authentication is for network endpoints to exchange digital device identifier certificates (e.g., device identifier certificates having respective public keys). In general, a device identifier certificate binds identifying information of a network endpoint to a cryptographic key for the network endpoint. A first network endpoint may authenticate a second network endpoint by first validating the second network endpoint's device identifier certificate to determine whether the certificate is to be trusted. After the device identifier certificate is validated, then the second network endpoint's device identity and public key may be extracted from the certificate. The public key may then be used to create a secure channel.

There are many types of secure connections. For example, a pair of network endpoints may communicate with each other using a transport layer-based secure connection, such as a mutual Transport Layer Security (mTLS) protocol-based connection. As another example, a pair of network endpoints may communicate with each other using a network layer-based secure connection, such as an Internet Protocol Security (IPSec)-based connection.

The decision by a first node as to whether the first node should form a secure connection with a second node may be based on one or multiple factors extending beyond whether or not the first node authenticates the second node. For example, the first node may be authorized to perform a selected subset of operations with the second node via a secure connection, or as another example, the first node may not be authorized to perform any operation with the second node. As a more specific example, a node may be a storage node of a particular cluster, and the storage node may be restricted to setting up secure connections with other storage nodes of the same cluster for purposes of performing certain operations, such as replicating data, balancing data, and so forth. Moreover, a storage node may be restricted to form secure connections with a particular subgroup of storage nodes of the cluster.

One way to establish secure connection permissions for a given node is to specifically configure the node with data that represents the permissions. For example, certificate pinning may be used to restrict secure connections for a given node to nodes that are associated with designated, or pinned, device identifier certificates. Consequentially, certificate pinning may restrict the given node from setting up secure connections with other nodes that are associated with other non-pinned device identifier certificates. Specifically configuring individual nodes of a cluster with secure connection permission-related information may be rather impractical, especially in a relatively large cluster (e.g., a cluster of hundreds, if not thousands, of nodes) in which nodes may be regularly replaced, upscaled, downscaled and regrouped.

In accordance with example implementations that are described herein, a first node and a second node may exchange device identifier certificates as part of a preliminary process in which the first and second nodes individually determine whether certain criteria are met for setting up a secure connection between the nodes. This preliminary process may be performed by a given node, in accordance with example implementations, without user input and without a specific node secure connection configuration.

More specifically, in accordance with example implementations, a first node may rely on a device identifier certificate that is provided by a second node for purposes of determining whether the first node is authorized to set up a secure connection with the second node. In accordance with example implementations, the first node may determine whether the first node is authorized, or permitted, to form a secure connection with the second node based on one or multiple logical identifiers that are contained in the second node's device identifier certificate. In accordance with example implementations, the first node may determine whether the first node is permitted to form the secure connection based on whether a particular logical identifier of the second node's device identifier certificate represents that the second node is a member of the same group as the first node. For example, in accordance with some implementations, the logical identifier may be a cluster identifier that identifies a specific cluster and consequentially, represents that the second node is a member of the same specific cluster of which the first node is a member. Continuing the example, in accordance with some implementations, the first node may determine that the first node is permitted to form a secure connection with the second node if a cluster identifier for the second node is the same as a cluster identifier of the first node. Stated differently, the first node proceeds to set up the secure connection responsive to the first node determining that the first and second nodes are part of the same cluster. In accordance with example implementations, the decision to set up the secure connection is based solely on the certificate information.

In accordance with example implementations, the device identifier certificate may be a local device identifier certificate, such as a locally significant device identifier certificate, or "LDevID certificate." The local device identifier certificate for the second node contains binding information that is bound to a cryptographic key for the second node. The binding information may contain physical identifiers that specifically identify physical attributes of the second node. In the context used herein, a "physical identifier" for a device (e.g., a node) refers to a tag, or label, which associates the device to an attribute that is specific to that device (e.g., a unique attribute of the device). For example, a local device identifier certificate for a particular node of a cluster may have such physical identifiers as a node serial number, a chassis serial number, a platform model identifier.

The binding information, in accordance with example implementations, further contains one or multiple logical identifiers that are associated with the second node. In the context used herein, a "logical identifier" refers to a tag, or label, for a device, which designates the device as being a member of a specific association, or group, of other members. For example, the local device identifier certificate for a particular node of a cluster may have a logical identifier (e.g., a cluster identifier (ID)) that designates the node as being a member of a particular cluster. The local device identifier certificates for other nodes of the same cluster may have logical identifiers (e.g., cluster IDs) that associate these nodes with the same cluster. As another example, a particular node may be viewed as being a group of components. As a more specific example, the node may be a compute appliance or storage appliance that corresponds to a compute node or a storage node, respectively. The components (a motherboard, a network expansion device, a storage device, and so forth) of a system, such as an appliance, may each be associated with a logical identifier (e.g., a system ID) that is shared in common among the components for purposes of associating the components to the same appliance. As another example, nodes that located in a particular data center may have respective data center logical identifiers that associate the nodes with the data center.

In accordance with example implementations, the binding information of the local device identifier certificate may include multiple logical identifiers, and these multiple logical identifiers may be ordered, or arranged, in a hierarchy. In this context, a "hierarchy" refers to a tree-like organization of elements, where the elements are linked by parent-child relationships. One or multiple logical identifiers may correspond to a first level of the hierarchy (e.g., the lowest hierarchical level corresponding to the root node of the hierarchical tree) and may be associated with logical associations (e.g., an association represented by a system identifier or an appliance identifier) for components of a node. The logical identifiers of the first level are parents of logical identifiers of a second level of the hierarchy (the hierarchical level directly above the first hierarchical level). One or multiple logical identifiers of the second level may, for example, be associated with logical associations (e.g., specific clusters) of the node. The logical identifiers of the second level may be parents of one or multiple logical identifiers of a third level of the hierarchy. As an example, one or multiple logical identifiers of the third level of the hierarchy may be associated with certain node groupings (e.g., specific cluster groups).

In accordance with example implementations, a first node may determine whether the first node is permitted to establish a secure connection with a second node based a specific logical identifier category. For example, the specific logical identifier category may be a cluster identifier, and a first node may determine whether the device identity certificate that is provided by a second node contains a cluster identifier that represents that the second node is part of the same cluster as the first node. In accordance with some implementations, the first node may base the determination of whether a secure connection is permitted with a second node based on multiple, specific logical identifier categories (e.g., logical identifiers from more than one hierarchical level). For example, a first node may form a secure connection with a second node if a cluster identifier and a cluster group identifier of the second node represent that the second node is part of the same cluster and cluster group as the first node.

Due to device identity certificate-based logical identifiers being used to determine permissions, or authorizations, for secure connections, a node may determine whether a particular secure connection is allowed, without the use of specific node configurations, certificate pinning or waiting for user input authorizing the secure connection.

Referring to FIG. 1, as a more specific example, in accordance with some implementations, a computing system 100 includes nodes 101, which are interconnected by network fabric 160. In accordance with some implementations, the nodes 101 may be part of a cluster. As examples, a given node 101 may be a storage node, a compute node, an administrative node, or any other node of the computing system 100. As depicted in FIG. 1, in accordance with some implementations, the computing system 100 may include one or multiple administrative nodes 170 and one or multiple management servers 180, which also may be connected to the network fabric 160.

The node 101, in accordance with example implementations, may be a computer platform. For example, in accordance with example implementations, the node 101 may be a modular unit, which includes a frame, or chassis. Moreover, this modular unit may include hardware that is mounted to the chassis and is capable of executing machine-executable instructions. A blade server is an example of the node 101, in accordance with an example implementation. The node 101 may be any of number of different platforms other than a blade server, in accordance with further implementations, such as a rack-mounted server, standalone server, a client, a desktop, a smartphone, a wearable computer, a networking component, a gateway, a network switch, a storage array, a portable electronic device, a portable computer, a tablet computer, a thin client, a laptop computer, a television, a modular switch, a consumer electronics device, an appliance, an edge processing system, a sensor system, a watch, a removable peripheral card, or any other processor-based platform. Moreover, in accordance with further implementations, a node 101 may be disaggregated in that components of the node 101 may be connected by the network fabric 160.

The network fabric 160 may be associated with one or multiple types of communication networks, such as (as examples) Fibre Channel networks, Compute Express Link (CXL) fabric, dedicated management networks, local area networks (LANs), wide area networks (WANs), global networks (e.g., the Internet), wireless networks, or any combination thereof.

FIG. 1 illustrates components of an example node 101-1, in accordance with some implementations. One or multiple other nodes 101 of the computing system 100 may have architectures and components that are similar to the node 101-1, in accordance with example implementations. In accordance with some implementations, one or multiple nodes 101 of the computing system 100 may have different components and/or different architectures than the node 101-1. Moreover, in accordance with further implementations, the node 101-1 may have a different architecture and/or different components than what is depicted in FIG. 1 and described herein.

For the example implementation that is depicted in FIG. 1, the node 101-1 includes components that form a "host," such as one or multiple main hardware processors 104 (e.g., one or multiple central processing units (CPUs), CPU processing cores, or CPU semiconductor packages (or "sockets")); and a system memory 120. In this context, a "host" refers to a part of the node 101-1, which provides at least one operating system instance. The node 101-1 may contain one or multiple other components, such as a network interface controller (NIC) 140; a security cryptographic co-processor (called a "security processor 144" herein); a baseboard management controller (BMC) 130; storage devices; network expansion devices (e.g., Peripheral Component Interconnect express (PCIe) cards); input/output (I/O) devices; a video controller; and one or multiple storage drives.

As used herein, a "BMC," or "baseboard management controller," is a specialized service processor that monitors the physical state of a server or other hardware using sensors and communicates with a management system through a management network. The BMC may also communicate with applications executing at the operating system level through an input/output controller (IOCTL) interface driver, a representational state transfer (REST) API, or some other system software proxy that facilitates communication between the BMC and applications. The BMC may have hardware level access to hardware devices that are located in a server chassis including system memory. The BMC may be able to directly modify the hardware devices. The BMC may operate independently of the operating system of the system in which the BMC is disposed. The BMC may be located on the motherboard or main circuit board of the server or other device to be monitored. The BMC may be mounted to another board that is connected to the motherboard. The fact that a BMC may be mounted on a motherboard of the managed server/hardware or otherwise connected or attached to the managed server/hardware does not prevent the BMC from being considered "separate" from the server/hardware. As used herein, a BMC has management capabilities for sub-systems of a computing device, and is separate from a processing resource that executes an operating system of a computing device. The BMC is separate from a processor, such as a central processing unit, which executes a high-level operating system or hypervisor on a system.

In accordance with some implementations, the security processor 144 may provide trusted computing operations for the node 101-1, for purposes of ensuring that the node 101-1 consistently behaves in expected ways. As examples of trusted computing operations, the security processor 144 may generate cryptographic keys; store security artifacts (e.g., cryptographic keys and certificates); access security artifacts; erase security artifacts; store integrity measurement digests; provide signed integrity measurement digests for remote attestation; encrypt data; and decrypt data. The security processor 144 may provide a flexible access control mechanism based on policies, which may provide for sealing, such as sealing cryptographic keys to certain integrity measurement digest states (e.g., bind a key encrypting key of a storage device to a set of integrity measurements); unsealing cryptographic keys; or any other sealing-related function. As other examples, the security processor 144 may provide nonces for cryptographic communications; sign certificates; and provide random or pseudorandom numbers. The trusted computing operations may also include operations to configure the security processor 144 and operations to own the security processor 144.

The security processor 144, in accordance with example implementations, may be in the form of a semiconductor package (or "chip") that is mounted to a motherboard of the node 101-1. A secure memory 146 of the security processor 144 may store platform secrets, such as cryptographic keys, passwords, sealed cryptographic keys, passwords, certificates, public keys, private keys, and so forth. Moreover, the secure memory 146 may store data representing measurement digests. The security processor 144 may be designed according to industry standards to provide hardware-based, security functions while also resisting tampering and malicious software. A trusted platform module (TPM) is one example of the security processor 144. In accordance with further example implementations, the security processor 144 may be a virtual TPM (vTPM).

In accordance with some implementations, the security processor 144 may perform one or multiple trusted computing operations that are described in the Trusted Platform Module Library Specification, Family 2.0, Level 00, Revision 01.59 (November 2019), published by the Trusted Computing Group (hereinafter called the "TPM 2.0 Specification"). In accordance with further implementations, the security processor 144 may perform one or multiple trusted computing operations that are not described in the TPM 2.0 Specification.

The manufacturer of the node 101-1 may provision the node 101-1 with a digital, device identifier certificate. For example, in accordance with some implementations, the manufacturer may provision the node 101-1 with an initial device identifier certificate 110, such as an "IDevID certificate" that complies with the Institute of Electrical and Electronics Engineers (IEEE) 802.1AR standard. In accordance with some implementations, the manufacturer of the node 101-1, as part of the provisioning of the initial device identifier certificate 110, may store data representing the initial device identifier certificate 110 in one or multiple memories (e.g., the system memory 120, the memory 146 of the security processor 144, a memory 134 of the BMC 130, and so forth) of the node 101-1.

The initial device identifier certificate 110 cryptographically binds a cryptographic key for the node 101-1 to information 111 (called "binding information 111" herein) that is contained in the initial device identifier certificate 110. In accordance with example implementations, the cryptographic key may be an asymmetric key (e.g., a Rivest-Shamir-Adleman (RSA) key). The asymmetric key contains a first private part (called the "initial device identifier key" herein), such as a private IDevID key; and a second public part (called the "public initial device identifier key 117" or "public key 117" herein), such as a public IDevID key. Among its other content, the initial device identifier certificate 110 may contain data representing the public key 117 and a cryptographic signature 118.

In accordance with example implementations, the cryptographic signature 118 is a cryptographic hash, which is generated using a hashing algorithm that has content (e.g., the public key 117 and the binding information 111) of the initial device identifier certificate 110 as inputs. For purposes of validating the initial device identifier certificate 110 (e.g., for purposes of determining whether the initial device identifier certificate 110 is to be trusted), the hashing algorithm may be applied to the content of the initial device identifier certificate 110 to provide a cryptographic hash. This cryptographic hash may be compared to the cryptographic signature 118 for purposes of determining whether the cryptographic hash is the same as the cryptographic signature 118. If the cryptographic hash is the same as the cryptographic signature 118, then the initial device identifier certificate 110 passes validation. Otherwise, if the calculated cryptographic hash is different from the signature 118, then the validation of the initial device identifier certificate 110 fails.

In the context used herein, a "hash" (which may also be referred to as a "hash value," "cryptographic hash," or "cryptographic hash value") is produced by the application of a cryptographic hash function to a value (e.g., an input, such as an image). A "cryptographic hash function" may be a function that is provided through the execution of machine-executable instructions by a processor (e.g., one or multiple central processing units (CPUs), one or multiple CPU processing cores, and so forth). The cryptographic hash function may receive an input, and the cryptographic hash function may then generate a hexadecimal string to match the input. For example, the input may include a string of data (for example, the data structure in memory denoted by a starting memory address and an ending memory address). In such an example, based on the string of data the cryptographic hash function outputs a hexadecimal string. Further, any minute change to the input may alter the output hexadecimal string. In another example, the cryptographic hash function may be a secure hash function (SHA), any federal information processing standards (FIPS) approved hash function, any national institute of standards and technology (NIST) approved hash function, or any other cryptographic hash function. In some examples, instead of a hexadecimal format, another format may be used for the string.

In accordance with example implementations, the binding information 111 of the initial device identifier certificate 110 contains one or multiple physical identifiers for the node 101-1. For example, in accordance with some implementations, the binding information 111 may contain a node serial number for the node 101-1 (e.g., a number that uniquely identifies the node 101-1 relative to other nodes 101). As another example of a physical identifier, in accordance with some implementations, the binding information 111 may contain a platform model identifier (e.g., a stock keeping unit (SKU) code).

In accordance with example implementations, as part of the factory-provisioning of the initial device identifier certificate 110, the manufacturer may store data representing the private initial device identifier key in the memory 146 of the security processor 144. In accordance with some implementations, data representing the private initial device identifier key may be stored in a secure memory (e.g., a secure memory of the BMC 130) other than the memory 146 of the security processor 144.

The node 101-1 may not store data representing the private initial device identifier key, in accordance with further implementations. For example, in accordance with some implementations, the security processor 144 stores data representing a seed from which the private initial device identifier key may be derived. A particular advantage of storing data representing a seed rather than storing data representing the actual private initial device identifier key is that the seed may have a significantly smaller storage footprint (e.g., hundreds of bits for a seed versus thousands of bits for a private initial device identifier key). The provisioning of the node 101-1 with a seed may, for example, involve storing data in a secure memory (e.g., the memory 146 of the security processor 144 or a memory of the BMC 130) of the node 101-1, where this data represents the seed. As another example, the provisioning of the node 101-1 with a seed may involve programming a set of fuses (e.g., selectively blowing fuses and/or selectively setting anti-fuses of the BMC 130) so that the programmed set of fuses represents the seed. The node 101-1 (e.g., the node 101-1 via the BMC 130) may apply a key derivation algorithm, which uses the seed as an input, to generate the private initial device identifier key.

Upon its initial deployment, the node 101-1 may be field-provisioned with one or multiple local device identifier certificates 112. In accordance with some implementations, the local device identifier certificate 112 may be a locally significant device identifier certificate, or "LDevID certificate," which complies with the IEEE 802.1AR standard. As an example, a network administrator may, with the appropriate authorization, store data in a memory (e.g., the memory 146 of the security processor 144 and/or a memory of the BMC 130), which represents one or multiple local device identifier certificates 112. As an example, this provisioning may occur using the BMC 130 via a management server 180. As described herein, in accordance with example implementations, the local device identifier certificate 112 may also contain one or multiple logical identifiers 114 that correspond to respective devices. In this context, a "device" refers to an identifiable component, which may be associated with a particular membership. As examples, in accordance with some implementations, a "device" may be a component of an appliance. As another example, in accordance with some implementations, a "device" may be a node 101.

In accordance with example implementations, a given logical identifier 114 associates a corresponding device with a particular group. Stated differently, the logical identifier 114 represents that the corresponding device is a member of a particular group. As an example, a given logical identifier 114 may be a cluster identifier, which represents that the node 101-1 is a member of a particular cluster (i.e., a cluster being identified by the specific cluster identifier). In accordance with example implementations, other members (e.g., other nodes 101) of the particular cluster may have the same cluster identifier. In accordance with further example implementations, the cluster identifiers for nodes 101 belonging to the same specific cluster may differ (e.g., differ corresponding to manufacturer preferences), but these cluster identifiers may represent membership to the same specific cluster. In accordance with further implementations, members of the same cluster may share a predesignated portion (e.g., the first M digits) of the cluster identifier in common. As an example, a given logical identifier 114 may be a sequence of numerals; a sequence of letters; an alphanumeric sequence; a sequence containing one or multiple special characters ("$," "&" and so forth); a combination of any of the foregoing; or other information that represents a group membership.

The local device identifier certificate 112, in accordance with example implementations, includes content (e.g., certain binding information content 111, as further described herein) that is imported from the node's initial device identifier certificate 110. In accordance with some implementations, binding information 113 of the local device identifier certificate 112 is bound to a cryptographic key (e.g., an asymmetric cryptographic key, such as an RSA key) that includes a private part (a private local device identifier key, such as a private LDevID key) and a public part (called a "public local device identifier key 115," such as a public LDevID key).

Figure 2:
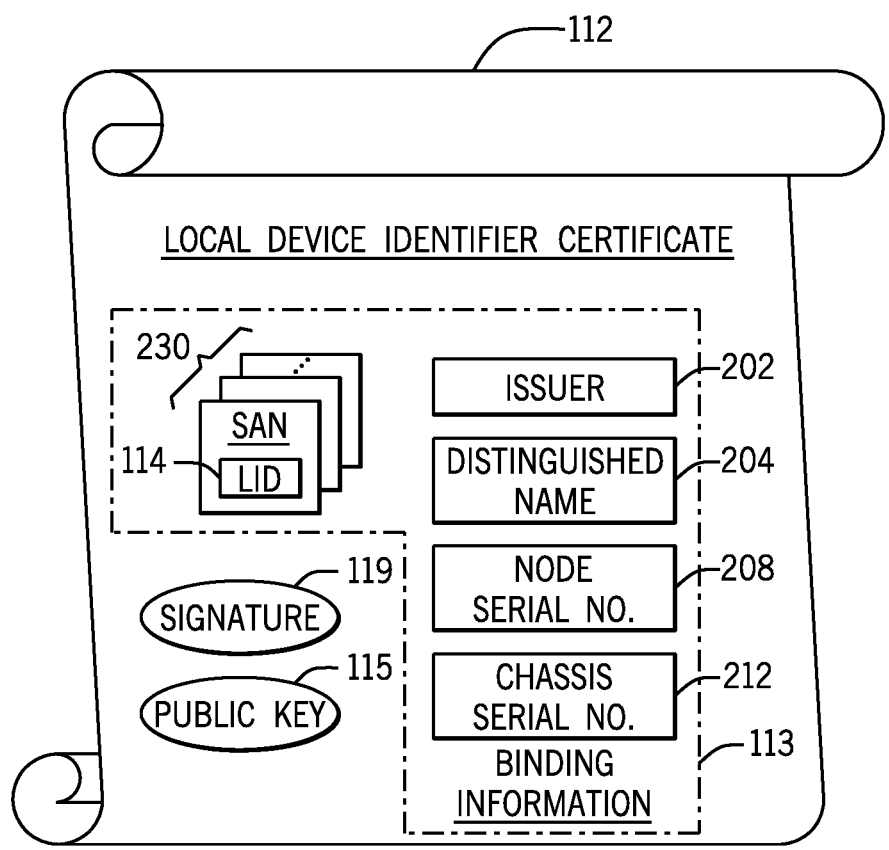
FIG. 2 is an illustration of a local device identifier certificate according to an example implementation.

In accordance with example implementations, the binding information 113 may share some content in common with the binding information 112 of the initial device identifier certificate 110. As a more specific example, FIG. 2 depicts example content of the local device identifier certificate 112, in accordance with some implementations. Referring to FIG. 2, the binding information 113 of the local device identifier certificate 112 may contain distinguished name attributes 204, which identify an organizational entity that is associated with the local device identifier certificate 112. For example, the distinguished name attributes 204 may include one or multiple of the following: a component serial number, an email address, an organizational unit name, an organization name, a physical address, a host name, an internet protocol (IP) address, and so forth. In accordance with example implementations, the binding information 111 of the initial device identifier certificate 110 many contain the same distinguished name attributes 204 as the local device identifier certificate 112.

In accordance with some implementations, the binding information 113 of the local device identifier certificate 112 may include a node serial number 208 (e.g., a unique identifier for the node 101-1). In accordance with example implementations, the binding information 111 of the initial device identifier certificate 110 many contain the same node serial number 208 as the local device identifier certificate 112.

In accordance with example implementations, the binding information 113 of the local device identifier certificate 112 contains content that is not present in the binding information 111 of the initial device identifier certificate 110. For example, in accordance with some implementations, the binding information 113 of the local device identifier certificate 112 may contain one or multiple physical identifiers that are not present in the binding information 111, such as a chassis serial number 212 of the node 101-1.

In accordance with example implementations, the binding information 113 of the local device identifier certificate 112 may contain one or multiple logical identifiers 114. As depicted in FIG. 2, in accordance with implementations in which the local device identifier certificate 112 is an LDevID certificate, the local identifiers 114 may be specified by content in respective subject alternative name (SAN) fields 230 of the LDevID certificate. In accordance with further implementations, a given logical identifier 114 may be specified by content appearing in a field other than an SAN field. The binding information 113 for the local device identifier certificate 112 may also include an issuer 202 of the local device identifier certificate 112.

As further depicted in FIG. 2, in accordance with example implementations, the local device identifier certificate 112 may contain a cryptographic signature 119. Similar to the cryptographic signature 118 of the initial device identifier certificate 110 (FIG. 1), in accordance with example implementations, the cryptographic signature 119 of the local device identifier certificate 112 may be a cryptographic hash of content of the local device identifier certificate 112, which may be generated with a cryptographic hash algorithm selection, the private local device identifier key and the content of the local device identifier certificate 112 as inputs.

In accordance with example implementations, a network administrator, who has the appropriate authorization, may take the following actions to create an local device identifier certificate 112 for a node. As an example, these actions may be undertaken via a remote management server 180 (FIG. 1) and the BMC 130 (FIG. 1) of the node. As a more specific example, the node may be a storage node, and the network administrator may create the local device identifier certificate 112 at the time of the logical storage configuration. The network administrator may generate an asymmetric cryptographic key for the local device identifier certificate 112 (e.g., generate a private local identifier key and a corresponding public local identifier key); copy content (e.g., the subject distinguished name attributes 204 and node serial number 208) from the initial device identifier certificate 110; and add additional content (e.g., the chassis serial number 212 and one or multiple logical identifiers 114) to the copied content to generate content to include in the local device identifier certificate 112. The network administrator may then send a certificate signing request to a certificate authority (CA), which issues the end local device identifier certificate 112, along with potentially one or multiple corresponding intermediate local device identifier certificates 112. The network administrator may then provision the node with the local device identifier certificate(s) 112 (e.g., store data representing the certificate(s) 112 in one or multiple memories of the node).

Referring back to FIG. 1, in accordance with example implementations, the node 101-1 includes a secure connection engine 150 that is constructed to set up secure connections with other nodes 101 of the computing system 100. More specifically, in accordance with some implementations, the secure connection engine 150 may, in response to a start-up (e.g., a power on or reset) of the node 101-1, discover other nodes 101 of the computing system 101 and communicate with each node 101 of the discovered nodes 101 for purposes of evaluating whether a secure connection with the node 101 should occur and if so, performing actions to set up the secure connection. More specifically, in accordance with some implementations, a pair of nodes 101 may exchange local device identifier certificates 112 such that each node 101 may authenticate the other node 101 based on the local device identifier certificate 112 received from the other node 101.

In accordance with some implementations, the secure connection engine 150 may validate the local device identifier certificate 112 that is provided by the other node 101. Assuming that the local device identifier certificate 112 that is provided by the other node 101 passes validation, the secure connection engine 150 may select one or multiple logical identifiers 114 contained in the local device identifier certificate 112 for purposes of determining whether the node 101-1 is authorized to have a secure connection with the other node 101.

For example, in accordance with some implementations, the secure connection engine 150 may set up secure connections with other nodes 101 if the other nodes 101 are determined to be part of the same cluster. For example, in accordance with some implementations, the secure connection engine 150 may set up a secure connection with another node 101 responsive to the other node 101 providing a valid local device identifier certificate 112, which contains a cluster identifier (representing a specific cluster) that represents that the other node 101 is a member of the same cluster as the node 101-1. It is noted that, depending on the particular implementation, the secure connection engine 150 may take into account one or multiple other logical identifiers 114 contained in the local device identifier certificate 112 provided by the other node 101.

In accordance with some implementations, the secure connection engine 150 may be formed from the execution of machine-readable instructions (e.g., instructions 124 stored in the system memory 120) by one or multiple main hardware processors 104 of the node 101-1. In accordance with further implementations, all or part of the secure connection engine 150 may be formed by dedicated hardware that does not execute machine-readable instructions. In this manner, in accordance with some implementations, all or part of the secure connection engine 150 may be formed from a complex programmable logic device (CPLD), a field programmable gate array (FPGA), an application specific integrated circuit (ASIC), and so forth.

Figure 3:
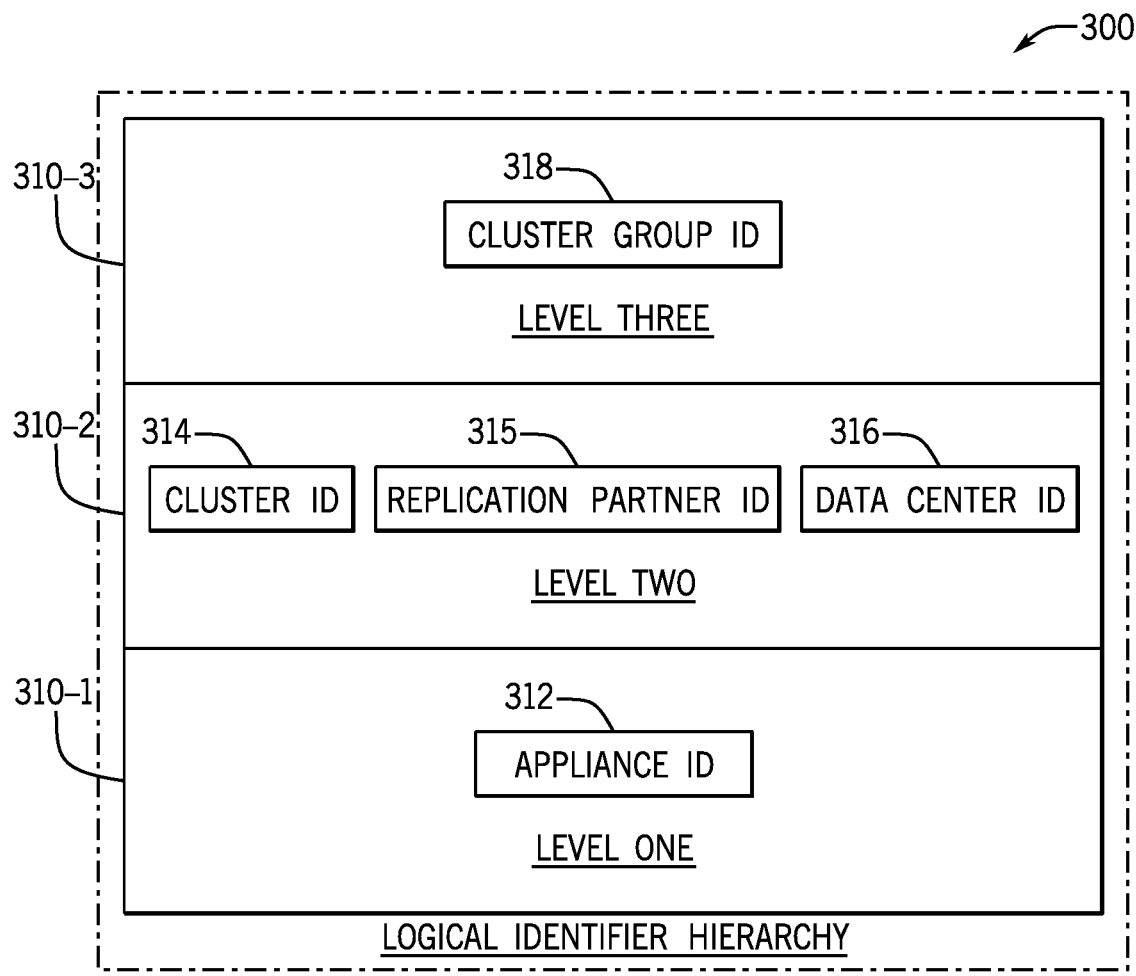
FIG. 3 is an illustration of a logical identifier hierarchy according to an example implementation.

The logical identifiers 114 may be organized in a hierarchy, in accordance with example implementations. FIG. 3 depicts an example logical identifier hierarchy 300, in accordance with some implementations, and FIG. 3 depicts specific example logical identifiers 312, 314, 315, 316 and 318 (i.e., example logical identifiers 114 (FIG. 1)) of the logical identifier hierarchy 300. Although a three-level logical identifier hierarchy 300 is described herein as an example, in accordance with further implementations, the logical identifier hierarchy may have fewer than three levels or more than three levels. Moreover, in accordance with further implementations, the logical identifiers 114 may not be associated with a hierarchy.

Referring to FIG. 3, in accordance with some implementations, the logical identifier hierarchy 300 may be ordered according to different hierarchical levels 310. For the specific example depicted in FIG. 3, the hierarchical levels 310 include a first level 310-1 (labeled "Level One" in FIG. 3), the lowest level 310, which contains one or multiple logical appliance identifiers 312. In accordance with some implementations, components (e.g., a motherboard, an expansion card, an attached storage drive, and so forth) of a given node may be assigned the same appliance identifier 312.

As also depicted in FIG. 3, the logical identifier hierarchy 300 may include a second level 310-2 (labeled "Level Two" in FIG. 3), the next-to-lowest level 310, which contains one or multiple logical identifiers that represents associations, or memberships, of the node. For the example implementation that is depicted in FIG. 3, the second level 310-2 of the logical identifier hierarchy 300 may include one or multiple of the following: a logical cluster identifier 314, a logical replication partner identifier 315 and a logical data center identifier 316. The cluster identifier 314 may, for example, contain a specific identifier for a cluster to which the node belongs. Moreover, the node may serve as a replication partner with other nodes, and accordingly, these replication partners may have replication partner identifiers 315 that represent membership in the same replication partner group. As another example, node may be distributed among multiple data centers, with the nodes that belong to a specific data center having data center identifiers 316, which represent the specific data center.

FIG. 3 further illustrates the highest level 310-3 (labeled "Level Three" in FIG. 3) of the logical identifier hierarchy 300, in accordance with example implementations. The third level 310-3 includes one or multiple logical cluster group identifiers 318. In this manner, a particular group of nodes of a cluster may, for example, belong to a particular failover group of nodes or other sub-cluster grouping. The nodes that are part of the same cluster group may have cluster group identifiers 318, which represent membership in the same cluster group.

Figure 4A:
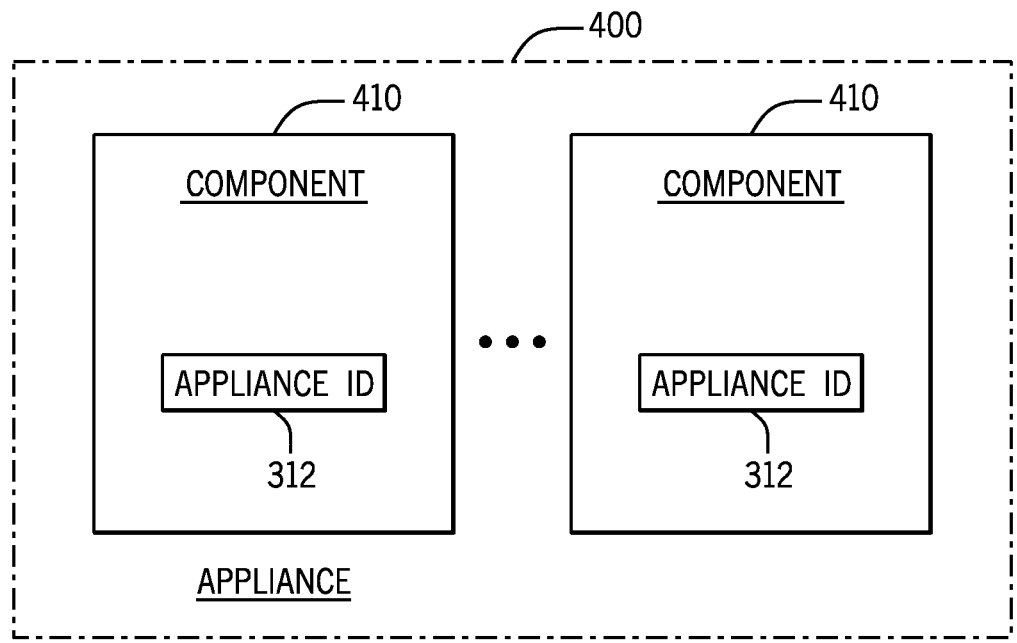
FIG. 4A is an illustration of components having respective logical appliance identifiers according to an example implementation.

FIG. 4A is an illustration of an appliance 400 (e.g., a node 101, a storage appliance, a compute appliance, and so forth) and the association of components 410 of the appliance 400 with different respective logical appliance identifiers 312. Referring to FIG. 4A, in accordance with some implementations, the components 410 may include storage components, motherboards, expansion cards, mezzanine cards, storage devices, and so forth. Each component 410, in turn, in accordance with some implementations, may be associated with a logical appliance identifier 312 for the component 410. In accordance with some implementations, each component 410 may store its logical appliance identifier 312 in a device identity certificate, such as an local device identifier certificate 112. In accordance with further implementations, each component 410 may store data representing its associated logical appliance identifier 312 in a memory of the component. In accordance with example implementations, components 410 that share the same logical appliance identifier 312 are part of the same appliance 400.

Figure 4B:
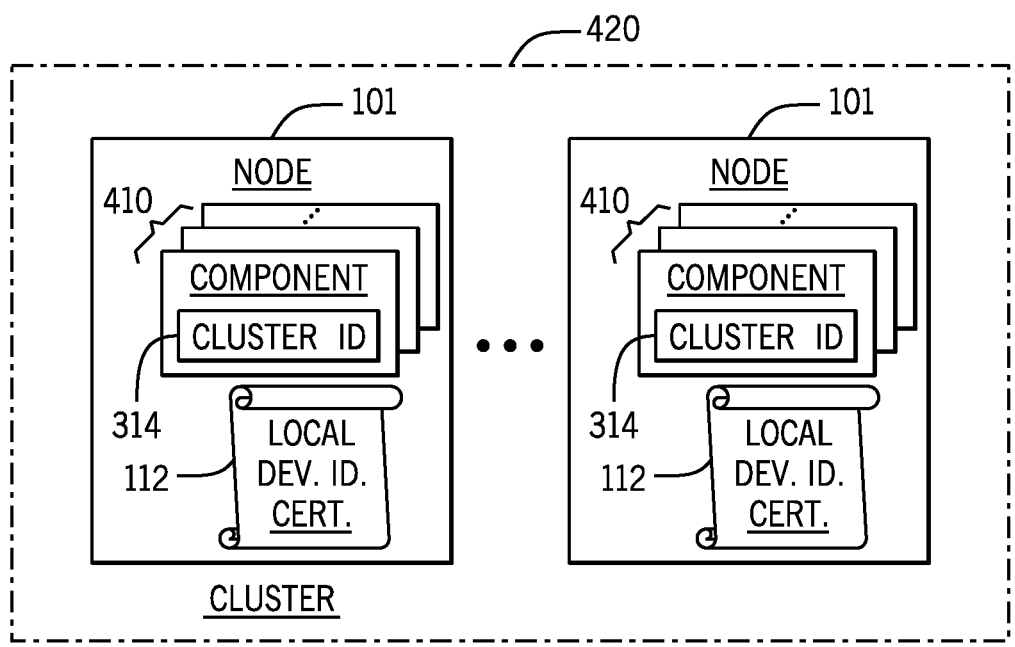
FIG. 4B is an illustration of node-based local device identifier certificates containing logical cluster identifiers according to an example implementation.

FIG. 4B is an illustration of a cluster 420 containing nodes 101. For this example, each node 101 contains a logical cluster identifier 314 that represents membership in the cluster 420. In accordance with example implementations, the node 101 includes components 410, which each component 410 having the same logical cluster identifier 314. Referring to FIG. 4B, in accordance with some implementations, each node 101 may store data representing an local device identifier certificate 112 that contains a logical cluster identifier 314.

Figure 4C:
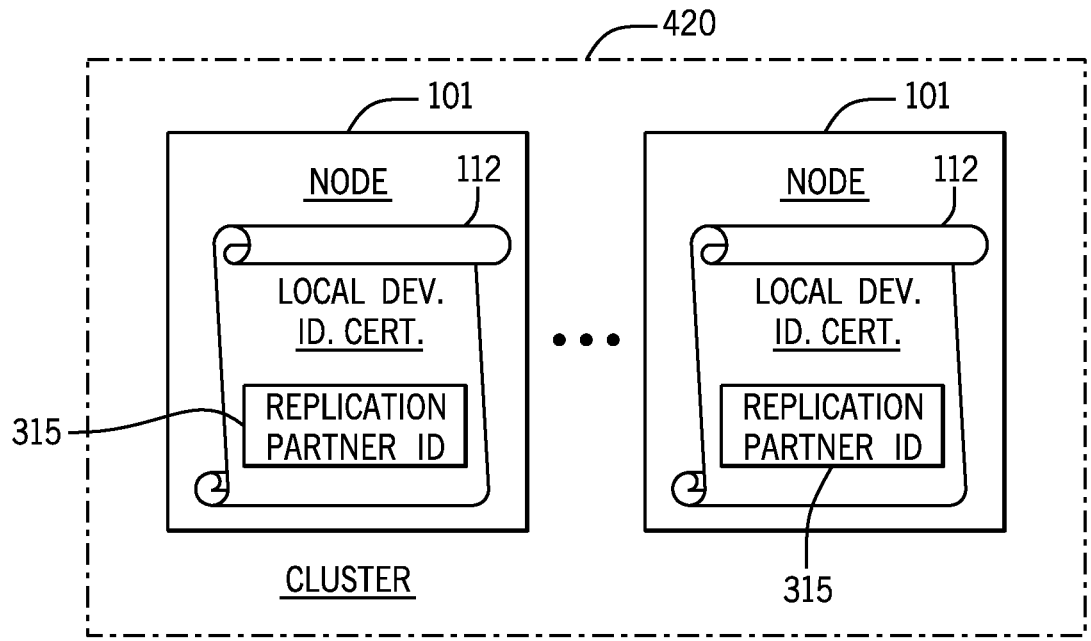
FIG. 4C is an illustration of node-based local device identifier certificates containing logical replication partner identifiers according to an example implementation.

FIG. 4C is an illustration of the cluster 420, for the case in which nodes 101 of the cluster 420 have associated logical replication partner identifiers 315. Referring to FIG. 4C, as an example, a particular node 101 of the cluster 420 may store data representing an local device identifier certificate 112 that binds the node 101 to a particular logical replication partner identifier 315. As such, the nodes 101 of the cluster 420 may be grouped according to the logical replication partner identifiers 315.

Figure 4D:
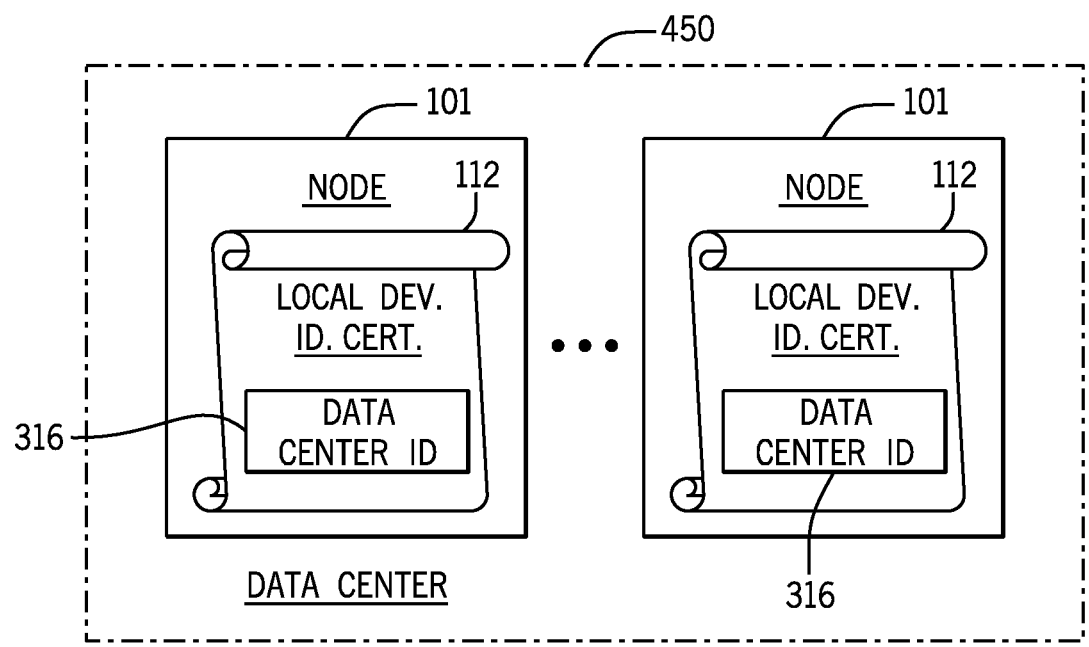
FIG. 4D is an illustration of node-based local device identifier certificates containing logical data center identifiers according to an example implementation.

FIG. 4D is an illustration of nodes 101 belonging to a particular data center 450. Referring to FIG. 4D, for this example, each node 101 may store data representing an local device identifier certificate 112 that binds the node 101 to a particular logical data center identifier 316. Therefore, for the example of FIG. 4D, for a given data center 450, the nodes 101 located in the data center 450 may have corresponding logical data center identifiers 316, which represent respective memberships in a group corresponding to the data center 450.

Figure 5:
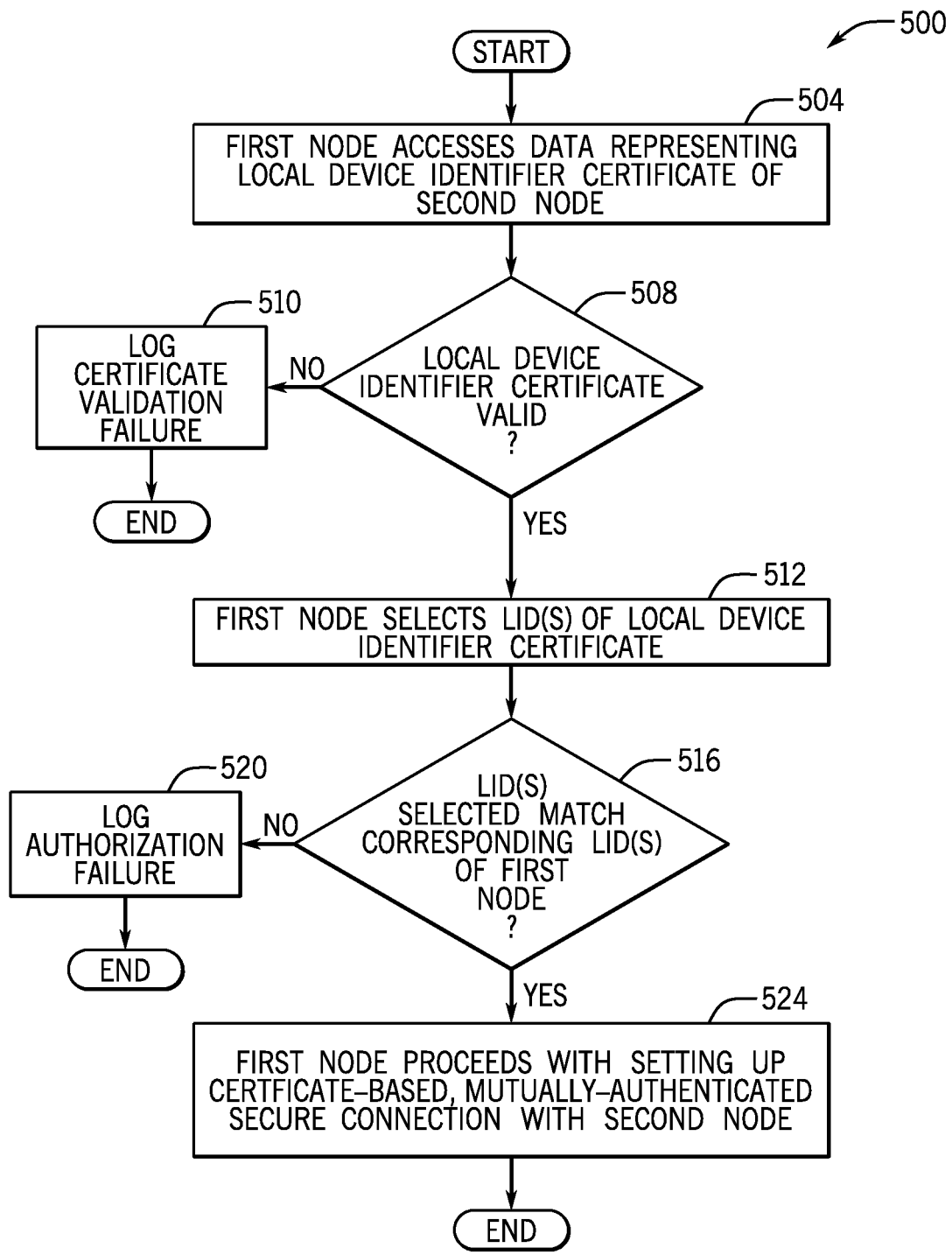
FIG. 5 is a flow diagram depicting a process performed by a first node to set up a secure connection with a second node based on local device identifier certificate-based logical identifiers according to an example implementation.

FIG. 5 depicts a process 500 that may be performed by a first node to set up a secure connection with a second node, in accordance with example implementations. As an example, in accordance with some implementations, the process 500 may be performed by the secure connection engine 150 (FIG. 1) upon start-up of the first node, responsive to the node connection engine 150 discovering the second node. The process 500 evaluates whether the first node is authorized to have a secure connection with the second node.

Referring to FIG. 5, pursuant to the process 500, the first node accesses data representing the local device identifier certificate of a second node. For example, this may involve the first node requesting the local device identifier certificate from the second node and may be part of a certificate exchange by the nodes. Pursuant to decision block 508, the first node determines whether the local device identifier certificate that is provided by the second node is valid.

In accordance with some implementations, the first node determining whether the local device identifier certificate is valid involves the first node initially validating a signature of the local device identifier certificate. In this context, "validating a signature of a certificate" refers to a process that determines whether the certificate is to be trusted, i.e., a process resulting in either a determination that the certificate signature passes validation (and the certificate is therefore to be trusted) or a determination that the certificate fails validation (and the certificate is not to be trusted).

The validation of the local device identifier certificate signature may, in accordance with example implementations, include using an Authority Key Identifier to identify the private key used to sign or the public key used to validate the local device identifier certificate and locate the corresponding CA certificate. In this manner, an issuer of the local device identifier certificate may sign the local device identifier certificate based on the content of the local device identifier certificate to provide the cryptographic signature. The issuer, may, for example, generate the signature based on a private key of the issuer and information that is contained in the non-signature fields of the local device identifier certificate. The first node may use the certificate signing public key (e.g., the CA public key) to validate the cryptographic signature. More specifically, in accordance with example implementations, the local device identifier certificate and the certificate of the issuer may be part of a certificate chain of trust of a public key infrastructure (PKI). The certificate chain of trust begins with a root CA certificate (or "root certificate"); includes zero, one or multiple intermediate certificates; and ends with the local device identifier certificate. The validation of the signature of the second node's local device identifier certificate may involve the first node validating a signature of each certificate in the certificate chain of trust that corresponds to the local device identifier certificate.

If, pursuant to decision block 508, the local device identifier certificate is determined to be invalid, then, pursuant to block 510, the first node logs the certificate validation failure, and the process 500 ends. Otherwise, if the local device identifier certificate passes validation, then, pursuant to block 512, the first node selects one or multiple logical identifiers of the local device identifier certificate. For example, in accordance with some implementations, the selection may involve the first node selecting a particular hierarchical level or a particular set of hierarchical levels of a logical identifier hierarchy and selecting the logical identifier(s) contained in the certificate for the selected hierarchical level(s).

Pursuant to decision block 516, the first node may then determine whether the selected logical identifier(s) from the local device identifier certificate match the corresponding logical identifier(s) of the first node. If not, then the first node logs (block 520) the authorization failure, and the process 500 ends. Otherwise, the first node is authorized to have a secure connection with the second node, and pursuant to block 524, the first node proceeds with setting up a certificate-based mutually-authenticated secure connection with the second node.

Figure 6:
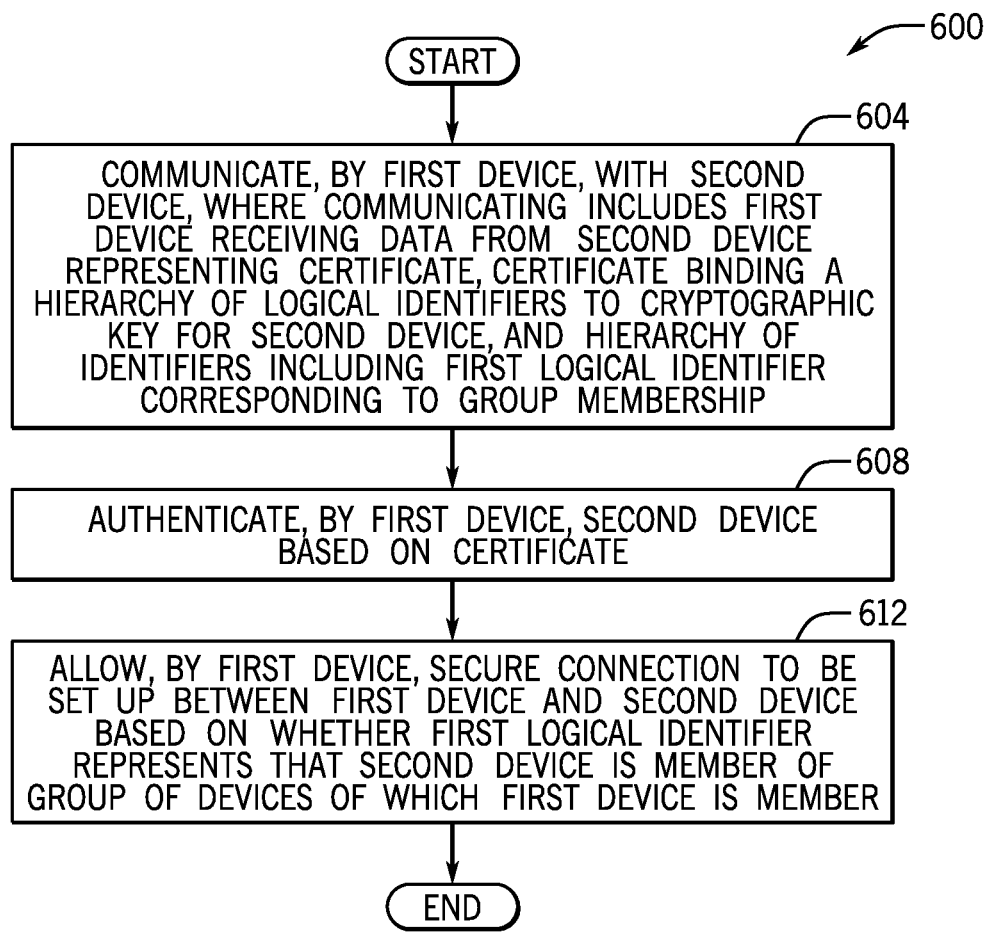
FIG. 6 is a flow diagram depicting a process performed by a first device to determine whether a secure connection with a second device is allowed based on a certificate-based logical identifier according to an example implementation.

Referring to FIG. 6, in accordance with example implementations, a process 600 includes communicating (block 604) by a first device, with a second device. In accordance with example implementations, the devices may be nodes of a computing system. For example, the devices may be nodes of a cluster, such as compute nodes, storage nodes, administrative nodes, or nodes performing other functions for the cluster. The communicating includes the first device receiving data from the second device that represents a certificate. In accordance with example implementations, the certificate may be a local device identifier certificate, such as, for example, an LDevID certificate. The certificate binds a hierarchy of logical identifiers to a cryptographic key. In accordance with some implementations, the cryptographic key may be an asymmetric key. The hierarchy of identifiers includes a first logical identifier that corresponds to a group membership. In accordance with example implementations, the group membership may be a membership of a particular cluster; a membership of a particular subgroup of nodes of a cluster; a membership of a group of clusters; a membership of components of a particular appliance; or any other membership. The process 600 includes authenticating (block 608), by the first device, the second device based on the certificate. The process 600 includes allowing (block 612), by the first device, a secure connection to be set up between the first device and the second device based on whether the first logical identifier represents that the second device is a member of a first group of devices of which the first device is a member. As examples, the secure connection may be an mTLS protocol-based connection, an IPSec-based connection, or another secure connection.

Figure 7:
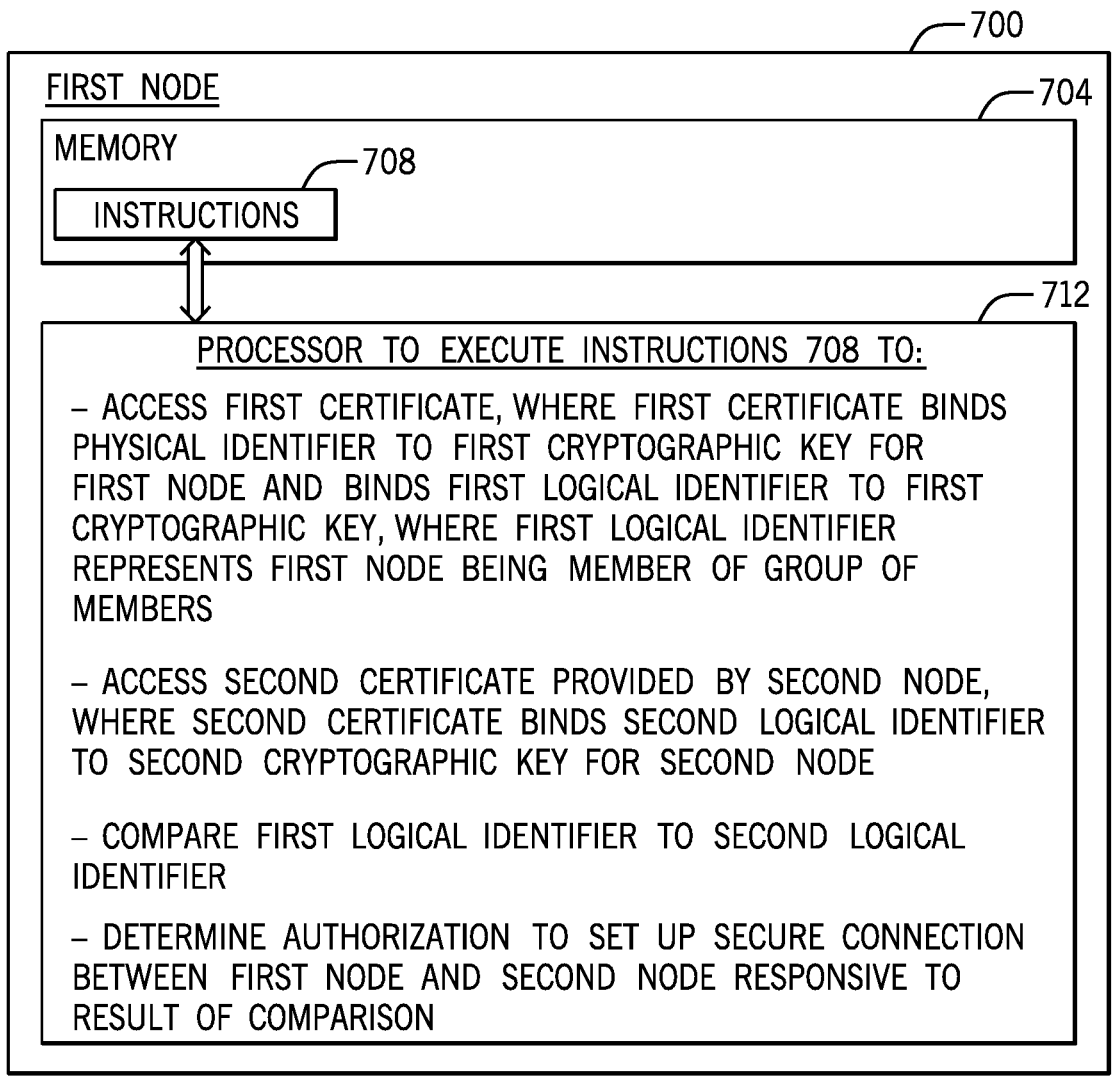
FIG. 7 is a block diagram of a first node that allows a secure connection to be set up with a second node responsive to a certificate-based logical identifier according to an example implementation.

Referring to FIG. 7, in accordance with example implementations, a first node 700 includes a processor 712 and a memory 704. The memory 704 stores instructions 708 that, when executed by the processor 712, cause the processor 712 to access a first certificate. In accordance with example implementations, the first certificate may be a local device identifier certificate, such as an LDevID certificate. The first certificate binds a first cryptographic key for the first node to a physical identifier and binds the first cryptographic key to a first logical identifier. In accordance with some implementations, the first cryptographic key may be an asymmetric key. The first logical identifier represents the first node being a member of a group of members. In accordance with example implementations, the group membership may be a membership of a particular cluster; a membership of a particular subgroup of nodes of a cluster; a membership of a group of clusters; a membership of components of a particular appliance; or any other membership. The instructions 708, when executed by the processor 712, further cause the processor 712 to access a second certificate that is provided by a second node. In accordance with example implementations, the second certificate may be a local device identifier certificate, such as an LDevID certificate. The second certificate binds a second cryptographic key for the second node to a second logical identifier. In accordance with example implementations, the second cryptographic key may be an asymmetric key. The instructions 708, when executed by the processor 712, further cause the processor 712 to compare the first logical identifier to the second logical identifier; and determine an authorization to set up a secure connection between the first node and the second node responsive to a result of the comparison. As examples, the secure connection may be an mTLS protocol-based connection, an IPSec-based connection, or another secure connection.

Figure 8:
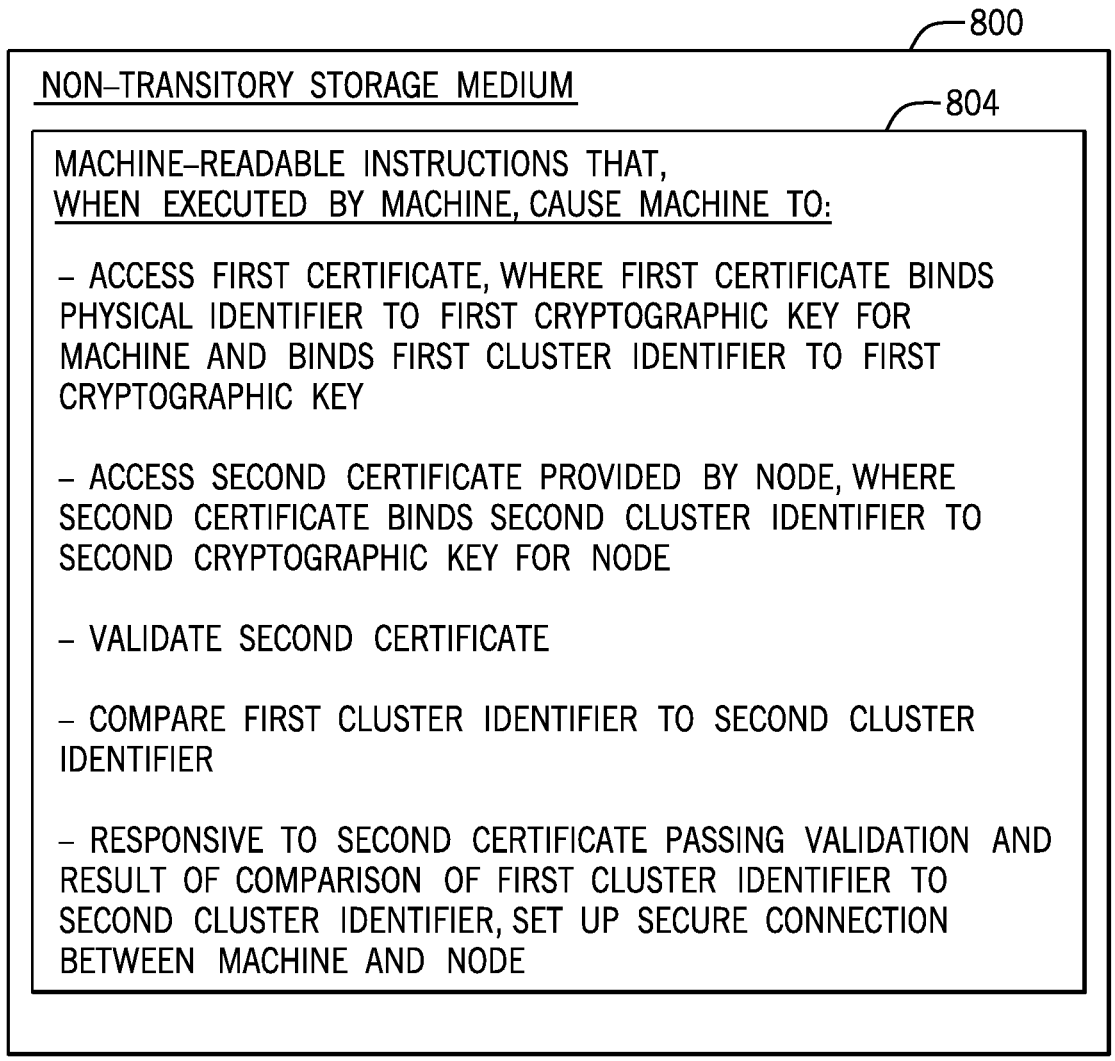
FIG. 8 is an illustration of machine-readable instructions that, when executed by a machine, cause the machine to set up a secure connection between the machine and a node responsive to a certificate-based cluster identifier according to an example implementation.

Referring to FIG. 8, in accordance with example implementations, a non-transitory storage medium 800 stores machine-readable instructions 804, which, when executed by a machine, cause the machine to access a first certificate. In accordance with example implementations, the first certificate may be a local device identifier certificate, such as an LDevID certificate. The first certificate binds a first cryptographic key for the machine to a physical identifier, and binds the first cryptographic key to a first cluster identifier. In accordance with example implementations, the first cryptographic key may be an asymmetric key. The instructions 804, when executed by the machine, further cause the machine to access a second certificate that is provided by a node. In accordance with example implementations, the second certificate may be a local device identifier certificate, such as an LDevID certificate. In accordance with example implementations, the node may be a computing platform of a computing system; and in accordance with some implementations, the node may be part of a cluster. As examples, the node may be a compute node, a storage node, an administrative node, or a node that performs a function other than administration, storage or computing for a computing system. The second certificate binds a second cryptographic key for the node to a second cluster identifier. In accordance with example implementations, the second cryptographic key may be an asymmetric key. In accordance with example implementations, the second cluster identifier may be represented by information that is contained in a subject alternative name (SAN) field of an LDevID certificate. The instructions 804, when executed by the machine, further cause the machine to validate the second certificate; and compare the first cluster identifier to the second cluster identifier. In accordance with example implementations, comparing the first cluster identifier to the second cluster identifier includes determining whether the first cluster identifier represents membership to the same group as the second cluster identifier. In accordance with example implementations, validating the second certificate includes validating the certificate based on a signature contained in the second certificate. The instructions 804, when executed by the machine, further cause the machine to, responsive to the second certificate passing validation and a result of the comparison of the first cluster identifier to the second cluster identifier, set up a secure connection between the machine and the node. As examples, the secure connection may be an mTLS protocol-based connection, an IPSec-based connection, or another secure connection.

In accordance with example implementations, the first logical identifier includes a cluster identifier, and the allowing of the secure connection includes permitting the secure connection responsive to a second cluster identifier for the first device being the same as the cluster identifier. A particular advantage is that a secure connection between nodes may be set up responsive to the exchange of certificates between the nodes.

In accordance with example implementations, the first logical identifier includes a cluster identifier, and the hierarchy of logical identifiers further includes an appliance identifier. The devices of the first group of devices are part of an appliance, and the devices of the first group are part of a cluster. Allowing the secure connection includes permitting the secure connection based on the appliance identifier and the cluster identifier. A particular advantage is that a secure connection between nodes may be set up responsive to the exchange of certificates between the nodes.

In accordance with example implementations, the authentication includes selecting a hierarchical level of the hierarchy of identifiers. Responsive to the selection, the process includes accessing a part of the certificate, which corresponds to the first logical identifier. A particular advantage is that a secure connection between nodes may be set up responsive to the exchange of certificates between the nodes.

In accordance with example implementations, the first logical identifier includes a replication partner identifier, a failover identifier or a data center identifier. A particular advantage is that a secure connection between nodes may be set up responsive to the exchange of certificates between the nodes.

In accordance with example implementations, the hierarchy of identifiers includes a second logical identifier. Allowing the secure connection further includes permitting the secure connection based on the second logical identifier. A particular advantage is that a secure connection between nodes may be set up responsive to the exchange of certificates between the nodes.

In accordance with example implementations, the first logical identifier is associated with a different hierarchical level of the hierarchy of identifiers and the second logical identifier. A particular advantage is that a secure connection between nodes may be set up responsive to the exchange of certificates between the nodes.

In accordance with example implementations, the process includes the first device setting up the secure connection responsive to the second device passing the authentication and the first logical identifier being the same as a second logical identifier contained in an identity certificate for the first device. A particular advantage is that a secure connection between nodes may be set up responsive to the exchange of certificates between the nodes.

In accordance with example implementations, setting up the secure connection includes setting up a mutually-authenticated secure connection with the second device. A particular advantage is that a secure connection between nodes may be set up responsive to the exchange of certificates between the nodes.

In accordance with example implementations, the secure connection may be a mutual Transport Layer Security (mTLS) protocol-based connection or an Internet Protocol Security (IPSec)-based connection. A particular advantage is that a secure connection between nodes may be set up responsive to the exchange of certificates between the nodes.

In accordance with example implementations, the first certificate includes a locally significant device identifier (LDevID) certificate, and the first cluster identifier corresponds to a subject alternative name (SAN) field of the LDevID certificate. A particular advantage is that a secure connection between nodes may be set up responsive to the exchange of certificates between the nodes.

While the present disclosure has been described with respect to a limited number of implementations, those skilled in the art, having the benefit of this disclosure, will appreciate numerous modifications and variations therefrom. It is intended that the appended claims cover all such modifications and variations.

What is claimed is:

1. A method comprising:
    communicating, by a first device, with a second device, wherein the communicating comprises the first device receiving data from the second device representing a certificate, the certificate binding a hierarchy of logical identifiers to a cryptographic key, and the hierarchy of identifiers comprising a first logical identifier corresponding to a group membership;
    authenticating, by the first device, the second device based on the certificate; and
    allowing, by the first device, a secure connection to be set up between the first device and the second device based on whether the first logical identifier represents that the second device is a member of a first group of devices of which the first device is a member.

2. The method of claim 1, wherein the first logical identifier comprises a cluster identifier, and the allowing of the secure connection comprises permitting the secure connection responsive to a second cluster identifier for the first device being the same as the cluster identifier.

3. The method of claim 1, wherein the first logical identifier comprises a cluster identifier, the hierarchy of logical identifiers further comprises an appliance identifier, devices of the first group of devices are part of an appliance, devices of the first group are part of a cluster, and the allowing of the secure connection comprises permitting the secure connection based on the appliance identifier and the cluster identifier.

4. The method of claim 1, wherein the allowing of the secure connection comprises:
    selecting a hierarchical level of the hierarchy of identifiers; and
    responsive to the selection, accessing a part of the certificate corresponding to the first logical identifier.

5. The method of claim 1, wherein the first logical identifier comprises a replication partner identifier, a failover identifier or a data center identifier.

6. The method of claim 1, wherein the hierarchy of identifiers comprises a second logical identifier, and the allowing of the secure connection further comprises permitting the secure connection based on the second logical identifier.

7. The method of claim 6, wherein the first logical identifier is associated with a different hierarchical level of the hierarchy of identifiers than the second logical identifier.

8. The method of claim 1, further comprising the first device setting up the secure connection responsive to the second device passing the authentication and the first logical identifier being the same as a second logical identifier contained in an identity certificate for the first device.

9. The method of claim 1, wherein the secure connection comprises a mutually-authenticated secure connection.

10. A first node comprising:
    a processor; and
    a memory to store instructions that, when executed by the processor, cause the processor to:
        access a first certificate, wherein the first certificate binds a first cryptographic key for the first node to a physical identifier and binds the first cryptographic key to a first logical identifier, wherein the first logical identifier represents the first node being a member of a group of members;
        access a second certificate provided by a second node, wherein the second certificate binds a second cryptographic key for the second node to a second logical identifier;
        compare the first logical identifier to the second logical identifier;
        determine an authorization to set up a secure connection between the first node and the second node responsive to a result of the comparison; and
        determine that the secure connection is authorized responsive to the first logical identifier representing membership to a group and the second logical identifier representing membership to the group.

11. The first node of claim 10, wherein the first logical identifier comprises a first cluster identifier, the second identifier comprises a second cluster identifier, and the instructions, when executed by the processor, further cause the processor to determine that the secure connection is authorized responsive to the first cluster identifier being the same as the second cluster identifier.

12. The first node of claim 10, wherein the instructions, when executed by the processor, further cause the processor to authenticate the second node based on the second certificate and set up the secure connection responsive to the second node passing authentication and a determination that the secure connection is authorized.

13. The first node of claim 10, wherein the secure connection comprises one of a mutual Transport Layer Security (mTLS) protocol-based connection or an Internet Protocol Security (IPSec)-based connection.

14. The first node of claim 10, wherein the first certificate binds the first cryptographic identifier to a third logical identifier, the second certificate binds the second cryptographic identifier to a fourth logical identifier, and the instructions, when executed by the processor, further cause the processor to:
    additionally compare the third logical identifier to the fourth logical identifier; and
    determine the authorization responsive to the comparison of the third logical identifier to the fourth logical identifier.

15. A non-transitory storage medium to store machine-readable instructions that, when executed by a machine, cause the machine to:
    access a first certificate, wherein the first certificate binds a first cryptographic identifier for the machine to a physical identifier, and binds the first cryptographic identifier to a first cluster identifier;
    access a second certificate provided by a node, wherein the second certificate binds a second cryptographic identifier for the node to a second cluster identifier;
    validate the second certificate;
    compare the first cluster identifier to the second cluster identifier;
    responsive to the second certificate passing validation and a result of the comparison of the first cluster identifier to the second cluster identifier, set up a secure connection between the machine and the node; and
    set up the secure connection responsive to the first cluster identifier being the same as the second cluster identifier.

16. The storage medium of claim 15, wherein the first cluster identifier comprises a first logical identifier, the second cluster identifier comprises a second logical identifier, the first certificate binds the first cryptographic identifier to a third logical identifier, the second certificate binds the second cryptographic identifier to a fourth logical identifier, and the instructions, when executed by the machine, further cause the machine to:
- compare the third logical identifier to the fourth logical identifier; and
- set up the second connection responsive to the result of the comparison of the third logical identifier to the fourth logical identifier.

17. The storage medium of claim 16, wherein the first logical identifier and the third logical identifier are associated with different levels of a logical identifier hierarchy.

18. The storage medium of claim 15, wherein the first certificate comprises a locally significant device identifier (LDevID) certificate, and the first cluster identifier corresponds to a subject alternative name (SAN) field of the LDevID certificate.

\* \* \* \* \*